US 9,104,874 B2

(12) United States Patent
Clevy et al.

(10) Patent No.: US 9,104,874 B2
(45) Date of Patent: Aug. 11, 2015

(54) METHOD FOR DETECTING THE HIJACKING OF COMPUTER RESOURCES

(75) Inventors: Laurent Clevy, Nozay (FR); Antony Martin, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 8 days.

(21) Appl. No.: 13/515,316

(22) PCT Filed: Dec. 8, 2010

(86) PCT No.: PCT/FR2010/052639
§ 371 (c)(1),
(2), (4) Date: Jun. 26, 2012

(87) PCT Pub. No.: WO2011/083226
PCT Pub. Date: Jul. 14, 2011

(65) Prior Publication Data
US 2012/0272316 A1    Oct. 25, 2012

(30) Foreign Application Priority Data
Dec. 21, 2009 (FR) ..................................... 09 59335

(51) Int. Cl.
*G06F 12/14*     (2006.01)
*G06F 17/00*     (2006.01)
(Continued)

(52) U.S. Cl.
CPC .............. *G06F 21/566* (2013.01); *G06F 21/55* (2013.01); *H04L 63/0407* (2013.01);
(Continued)

(58) Field of Classification Search
CPC ............ H04L 63/1416; H04L 63/1408; H04L 63/0236; H04L 63/0428; H04L 63/1466; H04L 63/08
USPC ................. 726/22, 13, 23; 713/153, 154, 168
See application file for complete search history.

(56) References Cited

U.S. PATENT DOCUMENTS

2003/0005157 A1*   1/2003   Chung et al. .................. 709/245
2007/0300286 A1   12/2007   Judge
(Continued)

FOREIGN PATENT DOCUMENTS

CN       101589595       11/2009
WO      2005088938        9/2005
(Continued)

OTHER PUBLICATIONS

P. Lincoln et al; Privacy-Preserving Sharing and Correlation of Security Alerts; Proceedings of the 13th Conference on USENIX Security Symposium; San Diego, CA; vol. 13; Aug. 9-13, 2004; XP-002590918; Retrieved from the internet URL:http//www.usenix.org/publications/library/proceedings/sec04/tech/full_papers/lincoln/lincoln.pdf; retrieved Jul. 7, 2007.
(Continued)

*Primary Examiner* — Aravind Moorthy
(74) *Attorney, Agent, or Firm* — Patti & Malvone Law Group, LLC

(57) ABSTRACT

An exemplary technique is provided for detecting a hijacking of computer resources, located in an internal network implementing security criteria and confidentiality criteria specific to the internal network, connected to an external network with no security criteria and confidentiality criteria, through a connection managed by a service provider. The technique includes storing, at the internal network, a connection parameter implemented by the computer resources to communicate with the external network; processing, at the internal network, the stored connection parameter based on an irreversible function to generate a unique code that corresponds to the stored connection parameter but which does not allow the identification of the stored connection parameter from the corresponding generated unique code; and sending, at the internal network, the generated unique code to a server located on the external network so that the server can analyze an activity of the computer resources from the unique code and detect any hijacking of the computer resources.

13 Claims, 2 Drawing Sheets

(51) Int. Cl.
*H04L 29/06* (2006.01)
*H04L 9/32* (2006.01)
*G06F 21/56* (2013.01)
*G06F 21/55* (2013.01)

(52) U.S. Cl.
CPC ........ *H04L 63/0236* (2013.01); *H04L 63/0428* (2013.01); *H04L 63/08* (2013.01); *H04L 63/1408* (2013.01); *H04L 63/1416* (2013.01); *H04L 63/1458* (2013.01); *H04L 63/1466* (2013.01); *H04L 2463/144* (2013.01)

(56) References Cited

U.S. PATENT DOCUMENTS

| | | | |
|---|---|---|---|
| 2008/0104182 A1* | 5/2008 | Jimmei | 709/206 |
| 2008/0256619 A1 | 10/2008 | Neystadt et al. | |
| 2009/0122721 A1* | 5/2009 | Ko et al. | 370/254 |
| 2009/0216852 A1* | 8/2009 | Filippi | 709/208 |
| 2009/0282476 A1 | 11/2009 | Nachenberg et al. | |
| 2010/0049975 A1* | 2/2010 | Parno et al. | 713/168 |
| 2010/0094989 A1* | 4/2010 | Li et al. | 709/224 |
| 2013/0086690 A1* | 4/2013 | Nachenberg et al. | 726/25 |

FOREIGN PATENT DOCUMENTS

| | | |
|---|---|---|
| WO | 2005091107 | 9/2005 |
| WO | 2007075813 | 7/2007 |
| WO | 2007081960 | 7/2007 |
| WO | 2008090531 | 7/2008 |

OTHER PUBLICATIONS

J. Parekh; Privacy-Preserving Event Corroboration; Columbia University; May 1, 2007; XP002590919; retrieved from the internet URL:http://www1.cs.columbia.edu/janak/research/thesis-20070501.pdf; retrieved Jul. 7, 2010.

* cited by examiner

| DNS name | messages ocurrences, | lowest TTL, | max IP per answer |
|---|---|---|---|
| 4thffrework.com | 3 | 0 | 5 |
| fireholiday.com | 9 | 5 | 3 |
| ... | | | |

Table 1b

| SMTP server | connections / day |
|---|---|
| smtp.orange.fr | 5 |
| smtp.yahoo.fr | 1 |
| smtp.gmail.fr | 2 | number of # SMTP servers used / day : 8

Table 1c (extract)
number of # SMTP servers used / day : 24

Fig. 2

METHOD FOR DETECTING THE HIJACKING OF COMPUTER RESOURCES

TECHNICAL FIELD

The invention pertains to a method for detecting the hijacking of computer resources.

BACKGROUND

A growing number of users have computer resources such as personal computers or mobile telephones, connected to public networks such as the Internet.

These connections can then be used by malicious third parties, also called "pirates" or "hackers", to contaminate these resources by using software, called viruses, and to hijack their activity for abusive or even illicit operations.

Generally, the users of the hijacked resources lack the computer training to enable them to satisfactorily protect their computers and/or detect the contamination of these resources.

Because of this, the hijacking of computer resources is typically implemented in a way that does not disrupt the function of these resources, which, in particular, makes it possible to not arouse suspicion by the user of these resources as to the contamination.

This is the case with computer viruses called "Bots" or "BotNets", an abbreviation of "Network of Bots", that propagate while minimising the visible impact on the contaminated computers.

It should be noted that such viruses can nevertheless carry out pirate operations that are especially damaging for the users of the contaminated and hijacked resources.

As an example, known "discrete" viruses can steal confidential data, such as code numbers and bank account numbers, to transmit them to third parties who can uses these confidential data in fraudulent ways.

Also, there are discrete viruses that can order the sending of "Distributed Denial of Services" (DDOS) SPAM, which generates a high volume (from several hundred or even thousands of infected machines) of fake network messages to an Internet site in order to disrupt or stop service, or even that can order the hosting of illegal content, for example, paedophilic content.

In this case, the viruses can affect the reputation, or even the civil liability, of the user of the hijacked resources.

In fact, it appears that users run the risk of being held liable for damages committed by their contaminated computer resources if these users cannot show that they have implemented suitable security measures, which is not easy for users who are not specialised in computer engineering.

Finally, a last problem with "discrete" viruses lies in their strong ability for contamination, since, if the user does not note a malfunction of the computer resources, significant time can elapse—during which the contamination will propagate—before the user acts to remove the virus.

In order to detect the hijacking of computer resources, the implementation of anti-virus software is common but limited to viruses defined in advance, using a statistical approach according to which the signatures, or fingerprints, of the viruses in anti-virus databases are static, even though new viruses are generated frequently, with some having the ability to dynamically modify their digital fingerprint. Additionally, few users regularly update their anti-virus software.

Also, the users of computer resources are faced with the problem of data confidentiality, especially when a user is a company that employs many workers.

In fact, in this case, the laws of many countries, France for example, prohibit companies or service providers from monitoring private connections, made by an employee or by a subscriber to an Internet service, thus making it impossible to detect connections to potentially dangerous sites.

SUMMARY

The present invention is the result of the observation that, outside of an internal network formed from computer resources subjected to security and confidentiality constraints, it is possible to identify the hijacking of computer resources on the internal network by analysing their behaviour, which is to say their connections and/or the communication they carry out with an external network that does not have these security and confidentiality constraints, typically a public network such as the Internet.

The invention also comprises the observation that in many cases, for example when the user is a small or medium-sized company, or an individual, the user does not have the means to analyse the behaviour of these resources and to detect hijacking through a behavioural analysis.

This is why the current invention concerns a method for detecting the hijacking of computer resources, located on an internal network implementing security and confidentiality criteria specific to this internal network, connected to an external network with no such security and confidentiality criteria, through a connection managed by a service provider, characterised in that it includes the following steps:

- The step of storing a connection parameter implemented by the computer resources to communicate with the external network,
- The step of processing this stored parameter based on an irreversible function, generating a unique code corresponding to said stored parameter but which does not allow the identification of said stored parameter, and
- The step of sending said generated code to a server located on the external network so that this server can analyse the activity of the computer resources from said unique code and detect any hijacking of the computer resources.

With the invention, an operator outside the internal network can analyse the behaviour of the resources while complying with the confidentiality and security criteria of the internal network. Thus, a user having limited means of computer analysis can call upon an external operator having the means, and expertise, necessary to detect the hijacking of the resources while preserving the confidentiality and security of the connections.

Typically, the connection parameter may be a domain name, of the type (google.fr), and/or an outgoing email server of the type (smtp.neuf.fr) where SMTP is the "Simple Mail Transfer Protocol" outgoing mail protocol.

In applying the method to several domain names and/or outgoing mail servers, the latter can then detect activity whose intensity and/or diversity makes it possible to suspect the hijacking of the analysed resources.

In one embodiment, the method comprises the step of considering at least one of the following elements as a connection parameter: the content of a header and/or body of a packet transmitted from the internal network to the external network, the identifiers included in DNS requests issued by the internal network to the external network, or the identifiers of recipients of emails sent by the internal network to the external network.

According to one embodiment, the method comprises the step of using a hashing function to generate a unique code based on said connection parameter such as, in particular, a domain name or mail server address.

In one embodiment, the method comprises the step of carrying out an internal analysis of the connection parameter within the internal network, prior to its processing, in order to detect the hijacking of resources or to generate a new connection parameter.

According to one embodiment, the method comprises the additional step of sending a report on the internal analysis to the remote server.

In one embodiment, the method comprises the step of sending non-coded parameters with the unique codes generated sent to the remote server.

According to one embodiment, the method comprises the step of considering information about the user's usage conditions when connecting to the external network to detect the hijacking of computer resources.

In one embodiment, the method comprises the step of considering information about the user's conditions for accessing the external network, this information being sent by the service provider, to detect the hijacking of resources.

The invention also pertains to computer resources, located within an internal network implementing security and confidentiality criteria specific to this internal network, connected to an external network with no such security and confidentiality criteria, through a connection managed by a service provider, characterised in that it comprises:

The means to store a connection parameter implemented to communicate with the external network, The means to process this stored parameter based on an irreversible function, generating a unique code corresponding to this stored parameter but which does not allow the identification of said parameter from the corresponding generated code, and The means to send the generated codes to a server located on the external network so that this server can analyse the activity of the computer resources from said unique code and detect any hijacking of the computer resources using a method according to one of the previous embodiments.

The invention also pertains to a server for detecting the hijacking of computer resources, located on an internal network implementing security and confidentiality criteria specific to this internal network, connected to an external network with no such security and confidentiality criteria, through a connection managed by a service provider, characterised in that, being located on the external network, the server comprises the means to analyse the computer resources from the unique codes generated by these computer resources using a method according to one of the previous embodiments.

DESCRIPTION OF THE DRAWINGS

Other characteristics and benefits of the invention will become clear upon examining the description below, which is given for illustrative purposes and is non-limiting, with reference to the attached figures, in which:

FIG. 2 is an analysis table implemented by a server according to the invention.

DETAILED DESCRIPTION

Figure 1:
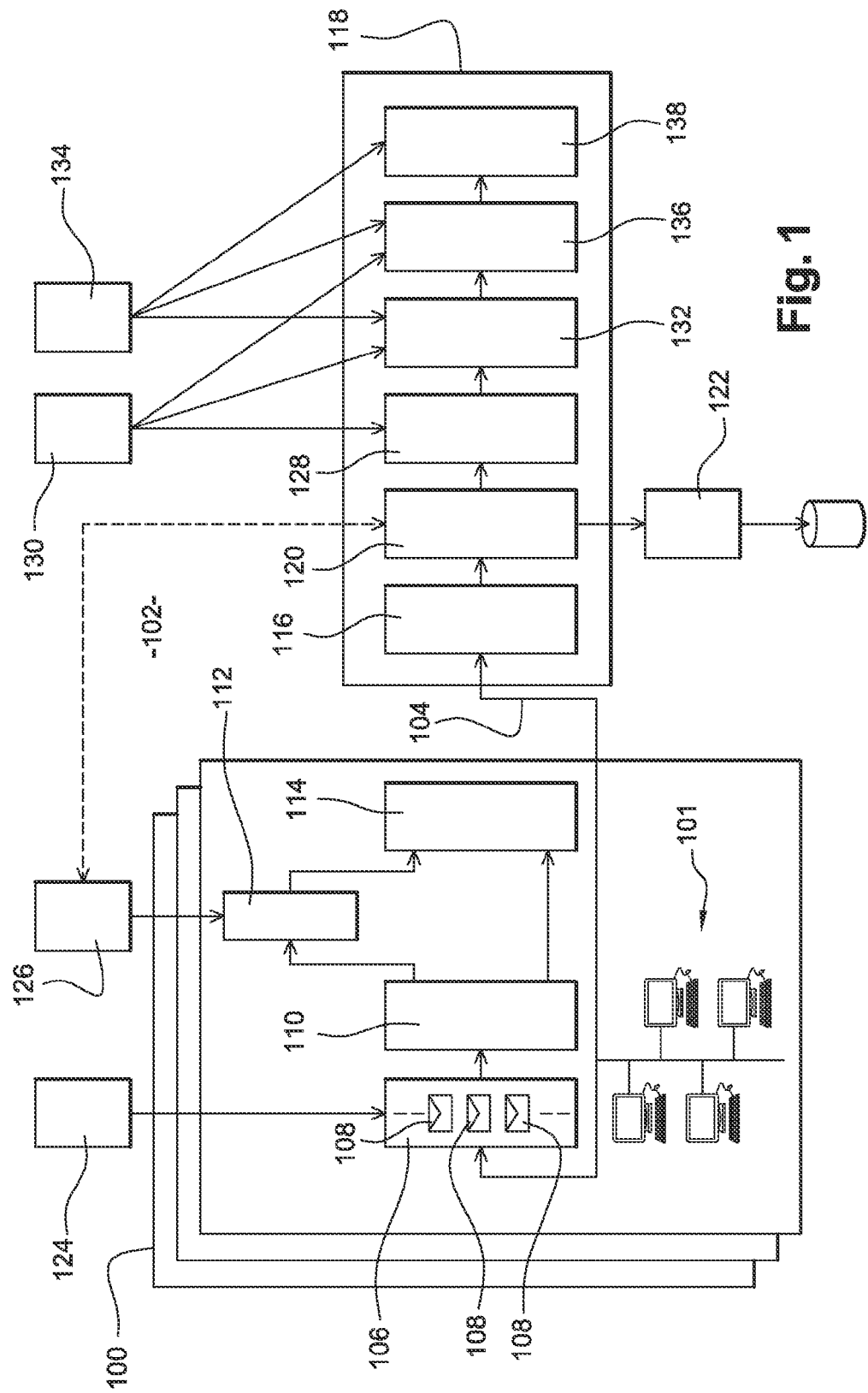
FIG. 1 schematically depicts one implementation of the invention.

With reference to FIG. 1, a method for detecting the hijacking of computer resources 101 according to the invention is implemented for an internal network 100 implementing security and confidentiality criteria specific to this internal network.

In this example, the internal network 100 is a company intranet comprising several interconnected terminals, the confidentiality criterion comprising a prohibition on identifying the domain names requested by a given terminal while the security criterion comprises the required usage of an ADSL (Asymmetric Digital Subscriber Line) high speed connection 104 to communicate with an external network 102 formed, in this example, by the Internet.

Therefore, even though the Internet 102 lacks the previously mentioned security and confidentiality criteria, a service provider managing the connection 104 can implement a method for detecting the hijacking of computer resources within the network 100 from this external network 102 by using the invention.

To that end, the internal network 100 carries out step 106 to filter and store the connection parameters 108 implemented by the computer resources 101 to communicate with the external network 102.

In this embodiment, we consider at least one of the following elements as connection parameters able to be filtered and stored:

The content of a header and/or body of data packets sent from the internal network 100 to the external network 102. Because of this, the content of the body and/or header of some packets may show the characteristics of the hijacking of resources or any suspicious activity, such as, for example, a relatively significant amount of email sent (several messages per second) and/via several outgoing mail providers (SMTP servers), more than 2.

Identifiers 108 included in requests sent to a DNS server on the external network.

To that end, it should be noted that the role of a DNS server is to resolve a request issued for a domain name, for example www.alcatel-lucent.com. More specifically, the DNS server has databases associating a domain name with at least one IP (Internet Protocol) address, which takes a form such as 93.178.174.3.

Then, queries of the DNS servers make it possible learn the activity of the internal resources 101 in terms, for example, of the diversity of servers with which the resources are communicating, with the understanding that this diversity is typically abnormally high when the internal resources 101 are being hijacked.

Identifiers for mail servers, such as SMTP servers processing email sent to the external network such as in this case, using SMTP, the "Simple Mail Transfer Protocol". Because of this, again, hijacked resources show especially high and variable activity when, for example, they are generating unwanted mail or "spam".

Based on these parameters, the invention implements a step 112 to process these stored parameters 108 based on an irreversible function generating a unique code from each stored parameter, so as to block any later identification of the processed parameter from the corresponding code.

This embodiment of the invention uses a hashing function to encode a stored parameter into a unique code, such as for example, the MD5 or SHA-1 functions.

Therefore, the confidentiality of the connection parameters is preserved, but nonetheless it is possible to analyse the behaviour of the resources 111, especially in terms of the diversity and quantity of connections made.

It should be noted that, within the internal network 100, an analysis 110 of the parameters can be carried out before their processing, in order to internally detect the hijacking of resources and/or to generate new parameters, for example statistical ones, later transmitted—step 114—in a report guaranteeing the confidentiality of the communication made by the resources 101.

With reference to FIG. 2, this type of advance or internal analysis can summarise the connections made, for example by DNS names requested—e.g. "4thfirework.com" or "fireholiday.com"—with a summary of the parameters that make it possible to suspect or characterise a hijacking of the resources in so-called "fast flow" networks, hijacking usage of the DNS protocol, such as, for example:

"messages occurrences" that are designed to analyse the addresses returned for various requests from a single domain name coming from different Internet servers. Because of this, the addresses associated with domain names linked to BotNets are addresses of privately owned machines, located around the world, without any geographic, technical, or administrative link, which should however be the case for a regular and/or legal domain name.

A Time to Live (or TTL) for the DNS data returned, of only a few seconds,

This step 114 can be implemented based on several reports, for example, when various connections 104 are implemented.

In this embodiment, non-coded data are also possible, i.e. unprocessed connection parameters are directly transmitted in step 114 with coded data, then to an outside server 118 when confidentiality constraints permit.

Therefore, this set of information is transmitted in a step 116 to said server 118 located on the external network 102. The server 118 can then externally analyse the unique codes generated in step 112, and any potential connection parameters sent in step 110, in order to study the activity of the computer resources 111 and detect—step 120—the hijacking of the computer resources.

To that end, the behaviour of the resources 111 can be compared, in terms of connections, with predetermined behaviours corresponding to various types of contamination.

For example "fast flow" behaviours can be detected by identifying specific DNS behaviours, as already described above, or by recognising domain names specific to viruses when these domain names can be transmitted.

Similarly, resources hijacked to send spam can be detected by analysing the SMTP behaviour of the resources 111, i.e. related to the recipients of the emails sent by these resources 111, or in the content of the emails sent identifying a Website for which the spam is being sent, or a botnet virus.

Depending on the subscription of the user of the resources 111, other detection processes might be implemented. For example a private individual typically does not host an HTTP server at home such that the receipt by the resources 111 of an HTTP request may be considered as a clue to a hijacking and can trigger a message to the address of this user, using a secure HTTPS page, such as:

"Dear Laurent Clevy, you are receiving this message because you have subscribed to the "network intrusion monitoring" service from your service provider. Please use the secure link below to redefine your Web profile as we may have detected some abnormal behaviour from your computer.

https://local/webprofile/LC"

By clicking on the link "https://local/webprofile/LC" the user—named Laurent Clevy in this example—will receive a message such as:

"Do you host an HTTP site so that third parties can access information stored on your computer? Yes/No".

Then, the user can help detect abnormal behaviour by his or her resources such as, in other examples, by indicating the servers to whom he intentionally sends email.

Also, the user may be required to allow the storage—step 122—of all connections made in order to carry out an analysis over a sliding time period, with the stored data from before a predetermined time being deleted.

The present invention may take many variations, especially when it is implemented through a subscription when opening a high speed Internet access line.

In this case, the user may subscribe to the resource hijacking detection service, a service that monitors DNS and/or SMTP requests in order to detect activities characteristic of contaminated resources.

Such a subscription could be made by telephone, then configured by the user him or herself, when he or she installs the means necessary to ensure the connection 104—typically an ADSL "Asymmetric Digital Subscriber Line" box when the computer resources 101 are computers.

In other cases, for example when the resources 101 are mobile terminals such as telephones, smartphones, PDAs "Personal Digital Assistants", and/or portable computers, the configuration of the means required to implement steps 108, 110, 112, and 114 mentioned above may be configured within the terminal at production, these resources being constrained by the limited means required for this implementation.

Then, the subscription might comprise three levels of service with increasing assistance in terms of speed, alerts, preventive storage of data, and availability of technicians in charge of helping the user of the resources 101.

Additionally, in the event of a subscription, the service provider might provide information at various steps:

During step 106 of filtering and storing connection parameters, information about one or more of the user's email addresses may be sent—step 124—to make it possible to identify the servers designed to transport and/or store these emails so that connections from the resources to these servers can be considered as predictable.

During the hashing step 112, information on any potential authorisation to store transmitted packets that thus makes it possible to analyse the packets that are suspected of being infected. When the service provider is given such an authorisation, these packets may be analysed, for example within a sliding time window so that packets that have been stored for a predetermined time are deleted.

During a processing step 128 to prevent the hijacking of resources comprising, for example: the complete storage of packets sent by the resources 111, a backup of personal data scanned with current anti-virus software, and a proposed download of secure software, in particular to browse the Internet and send email.

In this case, the service provider might provide—step 130—information on the subscription of the user of the resources 111 to the preventive processing service, for example concerning options that may or may not be included in the subscription.

During a basic processing step 132 comprising, in this embodiment, communication to the user of the detection of hijacked activity of his or her resources 111, of a warning about the risk of personal data privacy, of a limited diagnosis, and a contact address for remote assistance.

In this case, the service provider might provide—step 134—information about a subscription to this preventive processing service or to a remote processing service 136 designed to disinfect the contaminated resources 111 and to offer an estimate for later processing operations—or for on-site processing 138—intended to provide a technician to the site of the resources 111 within a requested time frame to identify the contaminated resources 111, back up strategic data, and potentially offer a replacement solution.

As shown in FIG. 1, steps 132, 136, and 138 can be implemented successively depending upon the subscription held by the user of the resources 111 with the operator carrying out the analysis of their behaviour.

The present invention is subject to many variants. Because of this, it was described with primary reference to domain names and/or outgoing mail server names as, currently, other network parameters for connections to the Internet are typically anonymous or provided by the Internet operator (IP address), but it is clear that the invention might be implemented with equivalent parameters according to communication protocols other than Internet protocol.

Additionally, it is clear that the invention could be configured by implementing the analysis of several connection parameters as well as by combining various methods for detecting computer virus contamination.

The invention claimed is:

1. A method for detecting a hijacking of computer resources, located in an internal network implementing security criteria and confidentiality criteria specific to the internal network, connected to an external network with no security criteria and confidentiality criteria, through a connection managed by a service provider, comprising the steps of:
    storing, at the internal network, a connection parameter implemented by the computer resources to communicate with the external network, wherein the connection parameter comprises a content of a body of a packet transmitted from the internal network to the external network or identifiers included in DNS server requests issued by the internal network to the external network;
    processing, at the internal network, the stored connection parameter based on an irreversible function to generate a unique code that corresponds to said stored connection parameter but which does not allow the identification of said stored connection parameter from the corresponding generated unique code; and
    sending, at the internal network, said generated unique code to a server located on the external network so that the server can analyze an activity of the computer resources from said unique code and detect any hijacking of the computer resources.

2. The method according to claim 1, wherein at least one of the following elements comprises the connection parameter: the content of the body of the packet transmitted from the internal network to the external network, the identifiers included in DNS requests issued by the internal network to the external network, or identifiers of recipients of emails sent by the internal network to the external network.

3. The method according to claim 1, further comprising the step of using, at the internal network, a hashing function to generate the unique code based on said stored connection parameter.

4. The method according to claim 1, further comprising the step of carrying out an internal analysis of said connection parameter within the internal network prior to the processing of the stored connection parameter to detect the hijacking of resources or to generate a new connection parameter.

5. The method according to claim 4, further comprising the step of transmitting, at the internal network, an internal analysis report to a remote server.

6. The method according to claim 5, further comprising the step of sending, at the internal network, the new connection parameter with the generated unique codes to the remote server.

7. The method according to claim 6, wherein the new connection parameter is an unprocessed connection parameter.

8. The method according to claim 1, further comprising the step of considering, at the internal network, information on the user's conditions for using the resources to connect to the external network to detect the hijacking of computer resources.

9. The method according to claim 1, further comprising the step of considering, at the internal network, information related to the user's conditions for using the resources to access the external network, the information being sent by the service provider to detect the hijacking of resources.

10. The method according to claim 1, wherein the confidentiality criterion comprises a prohibition on identifying domain names requested by a given terminal.

11. The method according to claim 1, wherein the security criterion comprises usage of an Asymmetric Digital Subscriber Line high speed connection to communicate with the external network.

12. Computer resources, located on an internal network, adapted to implement security and confidentiality criteria specific to the internal network, and connected to an external network with no security criteria and confidentiality criteria through a connection managed by a service provider, the computer resources being configured to:
    store, at the internal network, a connection parameter implemented to communicate with the external network, wherein the connection parameter comprises a content of a body of a packet transmitted from the internal network to the external network or identifiers included in DNS server requests issued by the internal network to the external network;
    process, at the internal network, the stored connection parameter based on an irreversible function to generate a unique code that corresponds to said stored connection parameter but which does not allow the identification of said stored connection parameter from the corresponding generated unique code; and
    send, at the internal network, the generated unique codes to a server located on the external network so that the server can analyze an activity of the computer resources from said unique code and detect any hijacking of the computer resources.

13. A server for detecting a hijacking of computer resources on an internal network adapted to implement security and confidentiality criteria specific to the internal network, connected to an external network with no security criteria and confidentiality criteria, through a connection managed by a service provider, the server being located on the external network, and the server being configured to analyze the computer resources from unique codes generated by the computer resources in the internal network, wherein the unique code is generated from a connection parameter stored in the internal network that comprises a content of a body of a packet transmitted from the internal network to the external network or identifiers included in DNS server requests issued by the internal network to the external network.

* * * * *